Feb. 14, 1961 C. L. LOVERCHECK 2,971,402
DUAL ENGINE
Filed Feb. 24, 1959
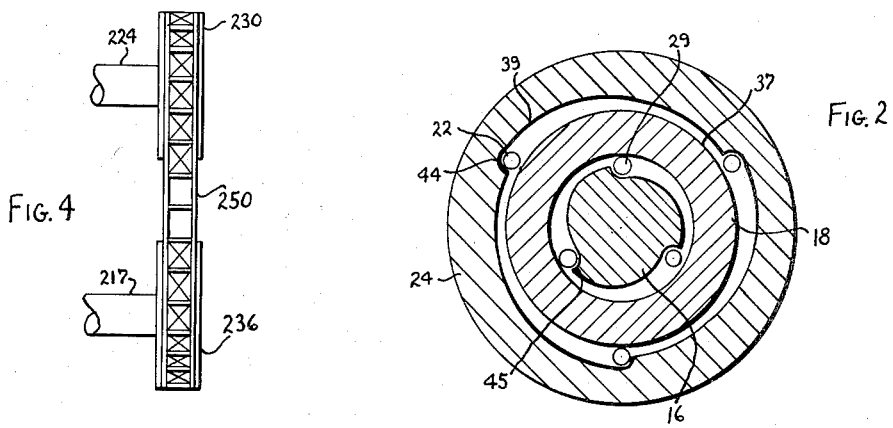
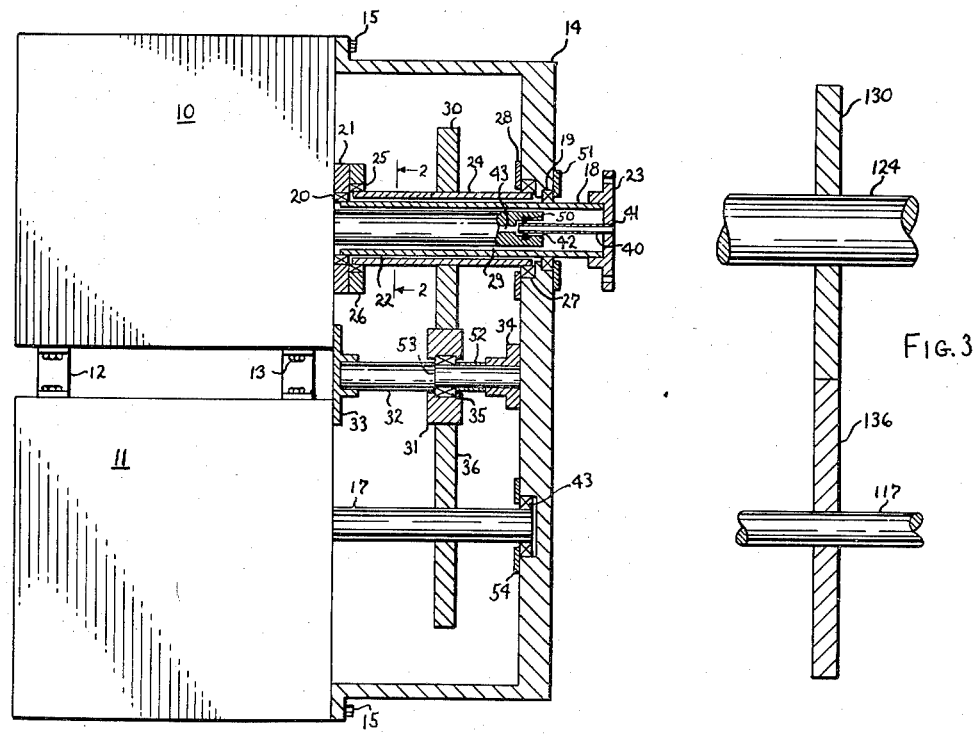
INVENTOR.
CHARLES L. LOVERCHECK

United States Patent Office 2,971,402
Patented Feb. 14, 1961

2,971,402

DUAL ENGINE

Charles L. Lovercheck, 632 W. 7th St., Erie, Pa.

Filed Feb. 24, 1959, Ser. No. 794,968

4 Claims. (Cl. 74—665)

This invention relates to multiple engine drives of general application and, more particularly, to a multiple engine drive particularly applicable for use on aircraft.

It is common practice to employ a group of propellers, for example, two or three, for driving an aircraft and each propeller is usually driven by its own motor by driving means which is independent of all of the other motors and propellers. As a result of this, if one of the motors becomes inactive for any reason, the drive for the aircraft becomes unbalanced and this unbalanced condition is aggravated by the fact that the propeller of the "dead" or idling motor is not rotating. The failure of independent driving units on aircraft such as this has been the cause of many forced landings and many accidents.

One of the objects of the present invention is to provide a driving mechanism for a propeller of an aircraft in which a single propeller is driven by a group of motors and in such a way that if any one of the motors becomes incapacitated, the other motors will continue the driving of the propeller and without rotating the "dead" motor. The improvement may be applied to an aircraft driven by a single propeller actuated by a group of motors and it is also quite applicable to an aircraft design in which the aircraft is driven by a plurality of propellers, for example, two or three, each propeller being driven by its own group of motors. In either case, if one of the motors becomes incapacitated, the propeller will continue to revolve under power. Where the improvement is applied to an aircraft which is driven by several propellers, the incapacitating of one of the motors will merely reduce the power of the drive to the propeller driven by one group of motors and it will be substantially impossible for an accident to be so extensive as to bring about the incapacity of any propeller.

In the preferred construction of the invention, the propeller is supported on a tube concentric to a crankshaft of one of the engines and this tube is driven from the inside by the crankshaft of the said engine and from the outside through a gear train from the other engine. The engines drive through an overrunning clutch arrangement between each of the engine drives and propeller drives so that either of the engines may stop and the other engine drive the propeller independent thereof.

It is, accordingly, an object of the invention to provide an improved engine.

Another object of the invention is to provide a single engine which will have two separate functioning apparatus, either of which will automatically and independently drive an output member.

Still another object of the invention is to provide an improved clutch arrangement in combination with two prime mover members.

A further object of the invention is to provide an engine which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a view of an engine and clutch assembly shown in cross section;

Fig. 2 is a view of the clutch arrangement taken on line 2—2 of Fig. 1;

Fig. 3 is a view of another embodiment of the invention; and

Fig. 4 is a view of still another embodiment of the invention.

Now with more particular reference to the drawing, engines 10 and 11 are shown, one supported above the other and held together by brackets 12 which are fastened to the engines 10 and 11 by means of bolts 13. A housing 14 for the drive assembly is shown attached to the engines 10 and 11 by means of bolts 15. Obviously, instead of two engines bolted together, the engine castings could be of a single casting with the housing 14 attached thereto.

The engines 10 and 11 each have individual fuel and ignition systems and have crank shaft extensions 16 and 17. The crank shaft extension 16 is disposed within and concentric to a propeller drive tube 18 which is piloted in bearings 19 and 20. The inside race of the bearing 19 may be attached to the drive tube 18 to hold the tube 18 from sliding outwardly and restrains it against end play. A plate 51 holds the bearing 19 in place. The bearing 20 is supported in a boss 21 which is fixed to the engine 10.

Clutch rollers 29 connect the crank shaft extension 16 to the tube 18. A flange 23 is fixed on the end of the tube 18 to attach the tube 18 to a suitable propeller.

An outside drive tube 24 is disposed concentric to the crank shaft extension 16 and concentric to the tube 18. The tube 24 has its inside end piloted in a bearing 25 which is supported in a plate 26 fixed to the engine 10. The outside end of the tube 24 is piloted in a bearing 27 which is supported in the housing 14 and held therein by a plate 28. The drive clutch rollers 29 drive the tube 18 from the tube 24 in a single direction.

A gear 30 is fixed to the outer drive tube 24 and it meshes with an idler gear 31. The idler gear 31 is freely rotatable with a shaft 32 which is supported on a bracket 33 at the inner end and on a bracket 34 at the outer end. An anti-friction bearing 35 is provided to carry the idler gear 31. The shaft 32 has one end machined down to form a shoulder 53 and the bearing 35 is held in position by a sleeve 52 which wedges between the bearing 35 and the bracket 34. A gear 36 is keyed to the crank shaft extension 17 and it meshes with the idler gear 31. The outer end of the crank shaft extension 17 is piloted in a bearing 43 which is held in position by a plate 54 and supported in a counterbore in the housing 14.

The rollers 29 are received between the crank shaft extension 16 and the tube 18 and rollers 22 are received between the tube 18 and the outer tube 24. It will be noted that cam surfaces 39 are inclined in such a direction that when the engine 11 rotates in a counterclockwise direction, the rollers 22 will wedge between the cam surfaces 39 and the tube 18. When the tube 18 rotates faster than the surfaces 39, the rollers 22 will move into the position shown and will not hold. Similarly, the rollers 29 will be wedged between surfaces 37 and the inner periphery of the tube 18 when the engine 10 drives the shaft extension 16 relative to the tube 18 and the shaft extension 16 will be locked to the tube 18. When the tube 18 rotates faster than the shaft extension 16, the rollers 29 will not bind. Therefore, either the engine 10 or the engine 11 will drive the tube 18 independent of the other. When one or the other engine is idle, the rollers 22 or 29 will be moved against a shoulder 44 or 45 and out of engagement with the tube 18. The shoulders 44 and 45 constitute concave pockets to receive the rollers 22 and 29 and hold them out of engagement with the tube 18 when the engine 10 or 11 is idle. The engine 11 will drive the propeller through the gear 36 and the idler gear 31 and the gear 30 when the engine 11 is rotating in a counterclockwise direction; however, the engine 11 may remain stationary when the engine 10 is driving the propeller.

In order to provide a control for a constant speed propeller, a tube 40 is supported in a bore 41 in a flange 23 and the tube 40 is received in a bore 42 in the crank shaft extension 16. An O-shaped washer is received in a groove 50 and forms a seal between the tube 40 and the shaft extension 16. Therefore, hydraulic oil may be forced through the bore 42 to control a variable pitch propeller supported on the flange 23.

In the embodiment of the invention shown in Fig. 3, no idler gear is used. An outer tube 124 has a gear 130 keyed thereto and the gear 130 meshes with a gear 136 which is keyed to a crank shaft extension 117. The crank shaft extension 117 is similar to the extension 17 in Fig. 1 and the outer tube 124 is similar to the tube 24 in Fig. 1. A similar clutching arrangement will be supported inside the outer tube 124 to that shown in Fig. 1 to connect a propeller thereto. The difference in the embodiment shown in Fig. 3 is that one engine must drive in the opposite direction from the other while in the embodiment shown in Fig. 1, the engines may both drive in the same direction.

In Fig. 4, a drive is shown such as in Figs. 1 and 2 but with one engine connected to the clutch by means of a band drive such as a sprocket and chain arrangement. Here, a sprocket 236 is connected to a sprocket 230 by a chain 250. The sprocket 236 is attached to a shaft 217 and the sprocket 230 is attached to a sleeve 224. The sleeve 224 is a tube such as the tube 24 in Fig. 1 with a similar clutch arrangement housed therein.

The foregoing specification sets forth the invention in in its preferred practical forms but the structure shown is capable of modification within a range of equivalents without departing from the spirit thereof or from the scope of the appended claims.

The embodiments of the invention in which an exclusive property or privilege is claimed are defined as follows:

1. A drive for a propeller comprising a first engine and a second engine connected together and having crank shaft means extending from each of said engines parallel to each other, housing means disposed around said crank shaft means, a propeller drive tube and an outer tube disposed around one said crank shaft means, said propeller drive tube and said outer tube being piloted at the inner end on one of said engines and at the outer end in said housing means, clutching means connecting said outer tube to said drive tube and said one crank shaft means to said drive tube to drive said drive tube when said outer tube and said one crank shaft means are driven in one direction and to allow said drive tube to rotate independently of said outer tube and said one crank shaft means, and gear means connecting said other engine to said outer tube.

2. The drive recited in claim 1 wherein an idler gear is disposed in said gear means whereby said engines rotate in the same direction.

3. The drive recited in claim 1 wherein said gear means comprises a sprocket on said other engine and on said outer tube and a chain connecting said sprockets.

4. A drive for a propeller comprising a first engine and a second engine connected together and having crank shaft means extending from each of said engines parallel to each other, a propeller drive tube and an outer tube disposed around one said crank shaft means, said propeller drive tube and said outer tube being piloted by means supported on said engines concentric to one said crank shaft means, clutching means connecting said outer tube to said drive tube and said one crank shaft means to said drive tube to drive said drive tube when said outer tube and said one crank shaft means are driven in one direction and to allow said drive tube to rotate independently of said outer tube and said one crank shaft means, and gear means connecting said other engine to said outer tube.

References Cited in the file of this patent

UNITED STATES PATENTS

| 2,149,785 | Neugebauer | Mar. 7, 1939 |
| 2,366,646 | Orr | Jan. 2, 1945 |
| 2,573,011 | Gruber | Oct. 30, 1951 |

FOREIGN PATENTS

| 95,483 | Sweden | Apr. 19, 1939 |